US009349160B1

(12) United States Patent
Bastani et al.

(10) Patent No.: US 9,349,160 B1
(45) Date of Patent: May 24, 2016

(54) METHOD, APPARATUS AND SYSTEM FOR ENHANCING A DISPLAY OF VIDEO DATA

(71) Applicant: Google Inc., Mountain View, CA (US)

(72) Inventors: Behnam Bastani, San Jose, CA (US); Mary Lou Jepsen, Sausalito, CA (US)

(73) Assignee: Google Inc., Mountain View, CA (US)

( * ) Notice: Subject to any disclaimer, the term of this patent is extended or adjusted under 35 U.S.C. 154(b) by 186 days.

(21) Appl. No.: 14/137,908

(22) Filed: Dec. 20, 2013

(51) Int. Cl.
*G06T 5/00* (2006.01)

(52) U.S. Cl.
CPC .......................................... *G06T 5/00* (2013.01)

(58) Field of Classification Search
CPC ...................... G06T 5/002; G06T 2207/20012; H04N 1/409; H04N 1/58; G02F 1/13336; G02F 1/133512; G02F 1/133524; G02F 1/133514; G09G 3/3666; G09G 2310/04; G09G 2320/043; G09G 2330/021; G09G 3/367
USPC ................ 382/275, 254; 375/240.29, 240.21; 345/473, 98
See application file for complete search history.

(56) References Cited

U.S. PATENT DOCUMENTS

| 7,145,611 | B2 | 12/2006 | Dubin et al. | |
| 7,295,178 | B2* | 11/2007 | Nakano | G09G 3/3666 |
| | | | | 345/205 |
| 7,339,625 | B2 | 3/2008 | Matthys et al. | |
| 7,495,638 | B2 | 2/2009 | Lamvik et al. | |
| 7,744,289 | B2 | 6/2010 | Hu | |
| 8,295,640 | B2* | 10/2012 | Thuries | G06K 7/10851 |
| | | | | 382/275 |
| 8,395,636 | B2 | 3/2013 | Gerets et al. | |
| 9,013,790 | B1* | 4/2015 | Kazmierski | G03B 21/567 |
| | | | | 359/443 |
| 9,176,370 | B1* | 11/2015 | Norton | G03B 21/625 |
| 9,223,536 | B1* | 12/2015 | Bastani | G06F 3/1423 |
| 2003/0117545 | A1 | 6/2003 | Coker et al. | |
| 2005/0206604 | A1* | 9/2005 | Washio | G09G 3/3677 |
| | | | | 345/98 |
| 2006/0012733 | A1 | 1/2006 | Jin et al. | |
| 2007/0237237 | A1* | 10/2007 | Chang | H04N 19/61 |
| | | | | 375/240.21 |
| 2007/0262997 | A1* | 11/2007 | Chen | H04N 5/144 |
| | | | | 345/473 |
| 2008/0030514 | A1* | 2/2008 | Ooishi | G06T 1/60 |
| | | | | 345/530 |
| 2008/0170801 | A1* | 7/2008 | Kozlov | G06T 5/20 |
| | | | | 382/275 |
| 2010/0026722 | A1* | 2/2010 | Kondo | G09G 3/2007 |
| | | | | 345/660 |
| 2010/0177261 | A1 | 7/2010 | Jin et al. | |

(Continued)

FOREIGN PATENT DOCUMENTS

WO WO-0120391 3/2001
WO WO-2013158248 10/2013

*Primary Examiner* — Mekonen Bekele
(74) *Attorney, Agent, or Firm* — Blakely Sokoloff Taylor & Zafman LLP

(57) ABSTRACT

Techniques and mechanisms for providing an enhanced display of video content. In an embodiment, analysis of one or more frames of audio-video (AV) information is performed to identify first video data as representing smooth image content, where second video data represents edge image content. Based on the identifying of the first video data, enhancement processing is performed to selectively apply a noise component to the first video data. Of the first video data and the second video data, the enhancement processing modifies only the first video data. In another embodiment, a refresh rate for displaying a sub-portion of a magnified image is selectively set based on the first video data being identified as representing smooth image content. Enhancement with selective noise and/or refresh rate variation improves perceived resolution of smooth image content, as seen by a viewer of the resulting image.

14 Claims, 10 Drawing Sheets

(56) References Cited

U.S. PATENT DOCUMENTS

| | | | |
|---|---|---|---|
| 2011/0135011 A1* | 6/2011 | Eddy | G06T 5/002 375/240.29 |
| 2012/0113239 A1* | 5/2012 | Krupnik | A61B 1/00009 348/65 |
| 2013/0093646 A1 | 4/2013 | Curtis et al. | |
| 2013/0109915 A1* | 5/2013 | Krupnik | G06K 3/4038 600/109 |
| 2013/0187962 A1 | 7/2013 | Vieri et al. | |
| 2015/0029175 A1* | 1/2015 | Kobayashi | G09G 3/3648 345/214 |
| 2015/0097837 A1* | 4/2015 | Jepsen | G06F 3/1446 345/428 |
| 2015/0097853 A1* | 4/2015 | Bastani | G09G 5/10 345/589 |
| 2015/0300812 A1* | 10/2015 | Bastani | G02F 1/00 356/614 |
| 2015/0379970 A1* | 12/2015 | Albrecht | G09G 5/393 345/214 |

\* cited by examiner the
METHOD, APPARATUS AND SYSTEM FOR ENHANCING A DISPLAY OF VIDEO DATA

BACKGROUND

1. Technical Field

This disclosure relates generally to displays, and in particular but not exclusively, relates to tiling displays.

2. Background Art

Large wall displays can be prohibitively expensive as the cost to manufacture display panels rises exponentially with display area. This rise in cost results from the increased complexity of large monolithic displays, the decrease in yields associated with large displays (a greater number of components must be defect free for large displays), and increased shipping, delivery, and setup costs. Tiling smaller display panels to form larger multi-panel displays can help reduce many of the costs associated with large monolithic displays.

While conventional multi-panel displays can reduce costs, visually they tend to have a major drawback. For example, a conventional display panel includes a bezel around its periphery. A bezel is a mechanical structure that houses a pixel region in which the display's pixels are disposed. In recent years, manufactures have reduced the thickness of bezels considerably to less than 2 mm. However, even these thin bezel trims are still very noticeable to the naked eye, distract the viewer, and otherwise detract from the overall visual experience.

Various approaches for obtaining seamless displays are being developed, include display lensing, blended projection, stackable display cubes, and LED tiles. However, as successive generations of display technologies continue to improve the size and resolution of display devices, the quality of image display at the edge-to-edge interfaces of display devices and the number of display devices which can be combined for displaying images, there is expected to be an increase in the perceptibility of limitations or flaws in such displayed images. Accordingly, there is an attendant need to reduce of otherwise mitigate the effects of such limitations or flaws.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Embodiments discussed herein variously provide for the displaying of selectively enhanced video content. Selective display enhancement may be based on a determination that a portion of video data represents either of what is referred to herein as edge image content and smooth image content. For example, video data may be enhanced to provide a dithering or other noise property to an image sub-portion which represents smooth image content. Such dithering/noise may improve perceived resolution of such smooth image content, as seen by a viewer of the resulting image.

Certain embodiments are discussed herein in the context of enhancing a display of video content by one or more tileable display panels which each include mechanisms to project magnified sub-images on a respective screen layer structure. However, certain embodiments are not limited in this regard, and such discussion may be extended to additionally or alternatively apply to enhancing a display of video content by any of a variety of other types of display devices.

Figure 1:
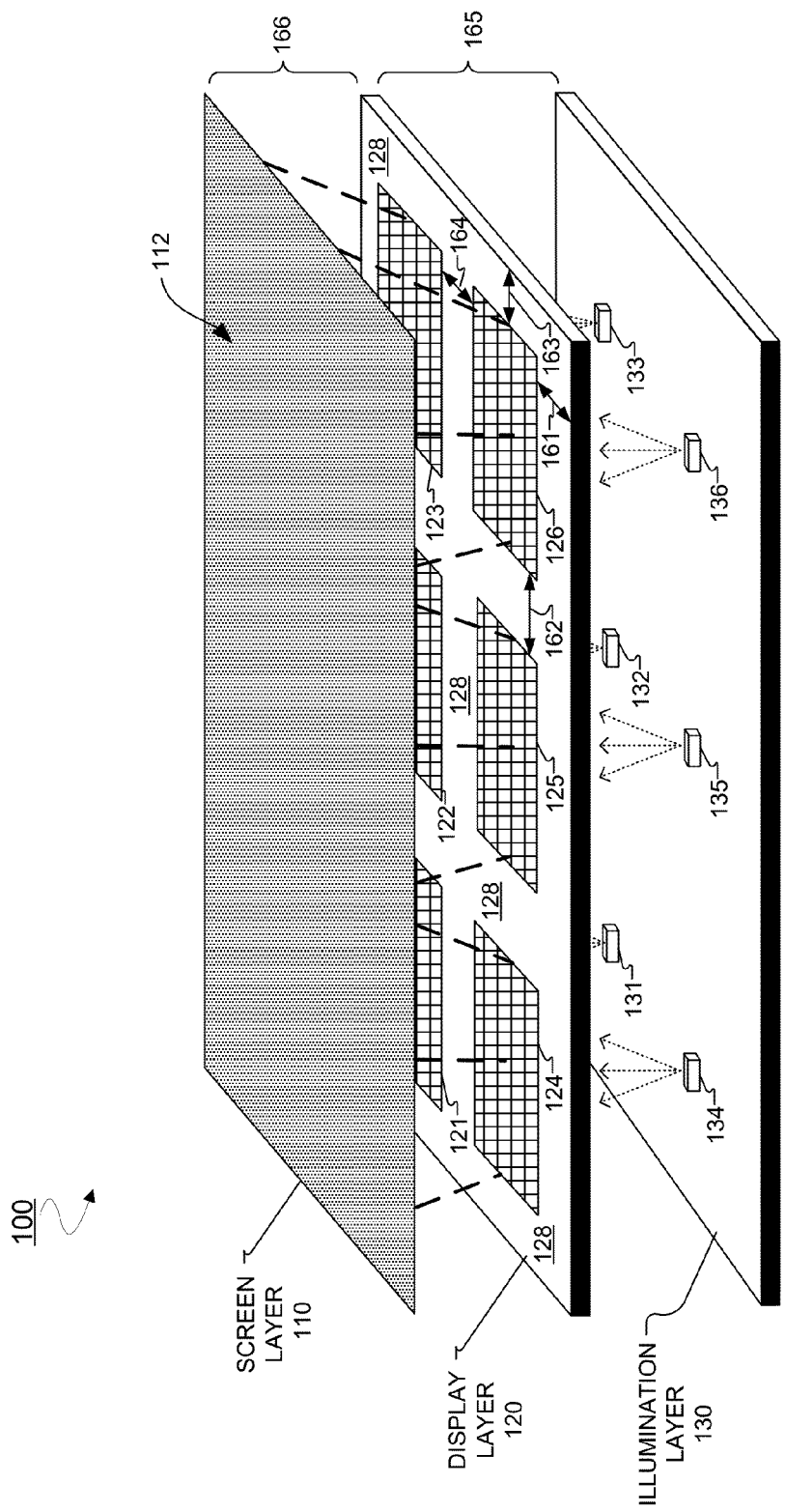
FIG. 1 is an illustration of a tileable display panel to display enhanced video data according to an embodiment.

FIG. 1 is an illustration of a tileable display panel according to an embodiment. In this embodiment, tileable display panel 100 includes display layer 120 disposed between screen layer 110 and illumination layer 130, which includes light sources 131, 132, 133, 134, 135, and 136 configured in a two-dimensional (2D) array. FIG. 1 shows that each light source in illumination layer 130 illuminates a corresponding array of transmissive pixels (referred to herein as a "pixelet" and described further below) to project a plurality of image sub-portions onto the backside of screen layer 110 so that the screen layer displays a unified image.

In one embodiment, each of light sources 131-136 of illumination layer 130 is a laser. In one embodiment, each light source is a light-emitting-diode ("LED") that emits light from a relatively small emission aperture. For example, LEDs with an emission aperture of 150-300 microns may be used. The LED may emit display light (e.g., white display light, blue display light, or any laser light). Each of light sources 131-136 is configured to emit its display light at a limited angular spread so the display light is directed toward a specific pixelet in display layer 120 (described further below). In one embodiment, additional optics are disposed over the light source in the array of light sources to define the limited angular spread of the display light emitted from the light sources. The additional optics may also increase brightness uniformity of the display light propagating toward the pixelets.

Display layer 120 is illustrated to include pixelets 121, 122, 123, 124, 125, and 126 configured as a matrix (i.e., a 2D array). The pixelets may be liquid-crystal-displays ("LCDs")—e.g., color LCDs or monochromatic LCDs. Where the pixelets are LCDs, a micro-lens in the pixel may not be needed. In one embodiment, each pixelet measures 20×20 mm.

Pixelets 121-126 are shown to be configured in a 2×3 matrix in this embodiment. The pitch between each pixelet in the matrix may be the same. In other words, the distance between a center of one pixelet and the center of its adjacent pixelets may be the same distance. In the illustrated embodiment, each light source in illumination layer 130 has a one-to-one correspondence with a pixelet. For example, light source 131 corresponds to pixelet 121, light source 132 corresponds to pixelet 122, light source 133 corresponds to pixelet 123, and so on. Also in the illustrated embodiment, each light source is centered under its respective corresponding pixelet. Other embodiments may have a different light source-to-pixel correspondence, or different light source positioning.

Display layer 120 also includes spacing regions 128 surrounding pixelets 121-126. Pixelet 126 is illustrated to be adjacent to pixelet 123 and 125. Pixelet 126 is spaced by dimension 162 from pixelet 125 and spaced by dimension 164 from pixelet 123. Dimensions 162 and 164 may be considered "internal spacing" and may comprise the same distance in some embodiments. Pixelet 126 is also spaced by dimensions 161 and 163 from edges of display layer 120. Dimensions 161 and 163 may be considered "external spacing" and are the same distance, in some embodiments. In one embodiment, dimensions 161 and 163 are half of the distance as dimensions 162 and 164. In one example, dimensions 161 and 163 are both 2 mm and dimensions 162 and 164 are both 4 mm.

Spacing region 128 contains a backplane region that may include pixel logic for driving the pixels in the pixelets. The architecture of tileable display panel 100 may increase space for additional circuitry in the backplane region. In one embodiment, the backplane region is used for memory-in-pixel logic. This memory may be used to allow each pixel to be refreshed individually instead of refreshing each pixel in a row at every refresh interval (e.g. 60 frames per second). In one embodiment, the backplane region is used for additional image processing.

While tileable display panel 100 may be used in high-resolution large format displays, the additional image processing capacity may also be useful for image signal processing, for example dividing an image into image sub-portions that are displayed by the pixelets. In another embodiment, the backplane region is used to embed image sensors. In one embodiment, the backplane region includes infrared image sensors for sensing three-dimensional 3D scene data in the display apparatus' environment.

In operation, display light from a light source (e.g. light source 131) propagates toward its corresponding pixelet (e.g. pixelet 121). Each pixelet drives their pixels to display an image sub-portion (i.e., a portion of a unified image to be displayed by tileable display panel 100) on the pixelet so the display light that propagates through the pixelet includes the image sub-portion displayed by the pixelet. Since the light source generates the display light from a small aperture and the display light has an angular spread, the image sub-portion in the display light gets larger as it gets further away from the pixelet. Therefore, when the display light (including the image sub-portion) encounters screen layer 110, a magnified version of the image sub-portion is projected onto a backside of screen layer 110.

Screen layer 110 is offset from pixelets 121-126 by distance 166 to allow the image sub-portions to become larger as the display light propagates further from the pixelet that drove the image sub-portion. Therefore, distance 166 may be a fixed distance selected to configure the size of the magnification of the image sub-portions. In one embodiment, fixed distance 166 is 2 mm. In one embodiment, each image sub-portion generated by pixelets 121-126 is magnified by 1.5×.

The backside of screen layer 110 is opposite viewing side 112. Screen layer 110 may be made of a diffusion screen that presents the unified image on viewing side 112 of screen layer 110 by scattering the display light (that includes the image sub-portions) from each of the pixelets 121-126. Screen layer 110 may be similar to those used in rear-projection systems. Screen layer 110 may have local dimming capabilities independent of light sources 131-136.

Figure 2:
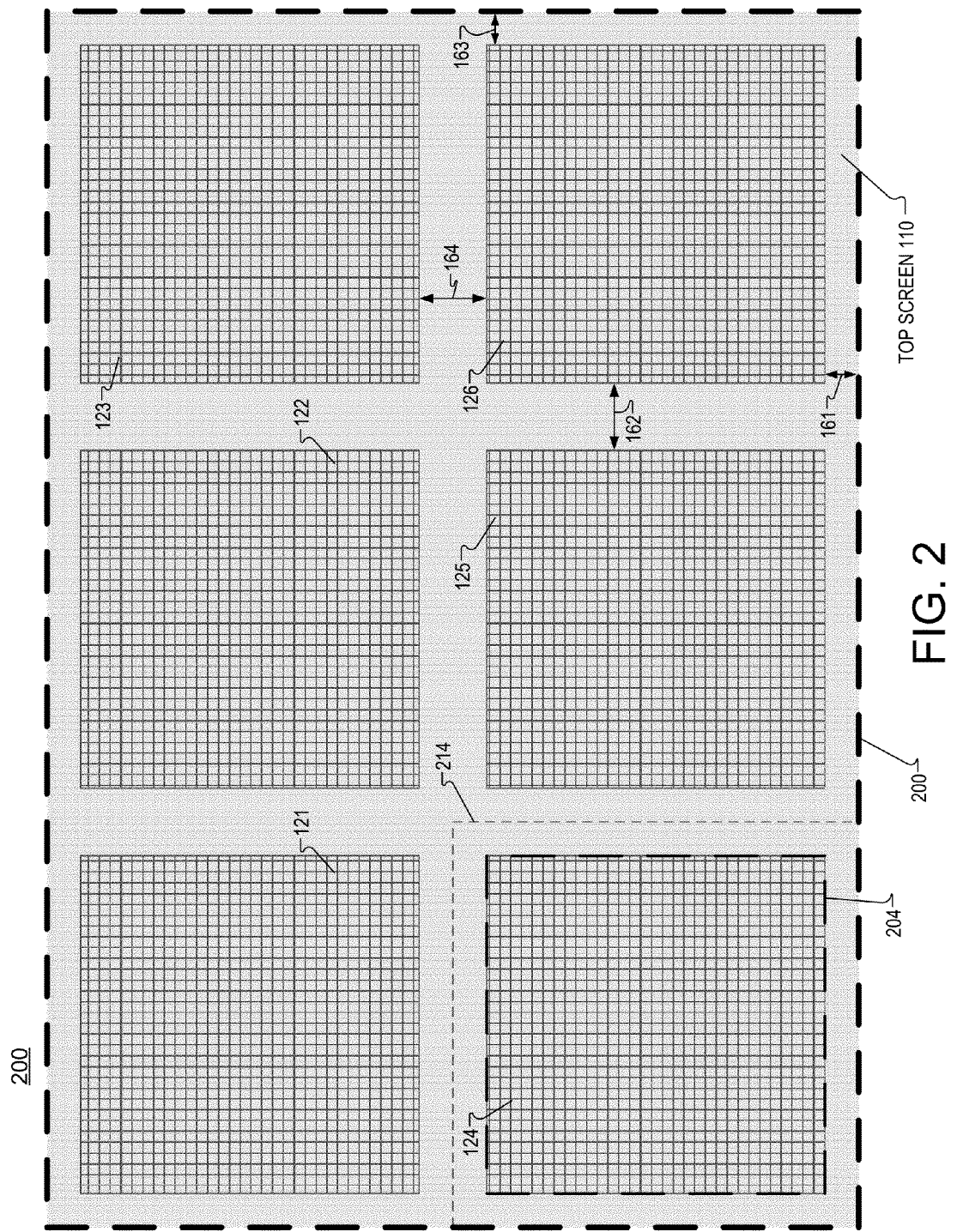
FIG. 2 is a transparent illustration of a tileable display panel according to an embodiment.

FIG. 2 is a transparent illustration of a tileable display panel according to an embodiment. FIG. 2 illustrates tileable display panel 100 looking through screen layer 110 to display layer 120. FIG. 2 shows how tileable display panel 100 can generate a unified image 200 using the magnified image sub-portions (e.g. image sub-portion 214) generated by light sources 131-136 and their corresponding pixelets 121-126. In this illustration, pixelet 124 generates image sub-portion 204 that is projected (using the display light from light source 134) on screen layer 110 as magnified image sub-portion 214. Although not illustrated, each of pixelets 121, 122, 123, 125, and 126 can also project a magnified image sub-portion onto screen layer 110 that is the same size as magnified image sub-portion 214. Those five magnified image sub-portions combined with magnified image sub-portion 214 combine to form unified image 200. In some embodiments, the geometric alignment of the magnified image sub-portions may leave virtually no gap (if any) such that unified image 200 is perceived as seamless by a viewer.

In FIG. 2, the magnified image sub-portions are illustrated to be roughly the same size and are similarly square-shaped. In other embodiments, said magnified image sub-portions may comprise any shape, any size, and in any combination. To generate same sized magnified image sub-portions, display layer 120 and pixelets 121-126 may be offset from light sources 131-136 by fixed dimension 165 (as shown in FIG. 1). In one embodiment, dimension 165 is 8 mm.

The device architecture of tileable display panel 100 further allows for controlling the brightness of light sources 131-136 based on the image/video content of the corresponding image sub-portions. Each pair of pixelets 121-126 and light sources 131-136 are independent of each other, and in some embodiments, light from one pair of pixelet and light source (e.g., pixelet 125 and light source 125) does not leak into any of its neighboring pairs (e.g., pixelet and light source pairs 124/134, 126/136 and 122/132). Selectively varying the brightness level and/or refresh rates for light sources 131-136 based on the image/video content of the corresponding image sub-portions allows for improved contrast in unified image 200 and a reduced power consumption for tileable display panel 100. Furthermore, embodiments may increase the available bit depth for pixel data, resulting in smoother gradients and improved image quality.

Figure 3:
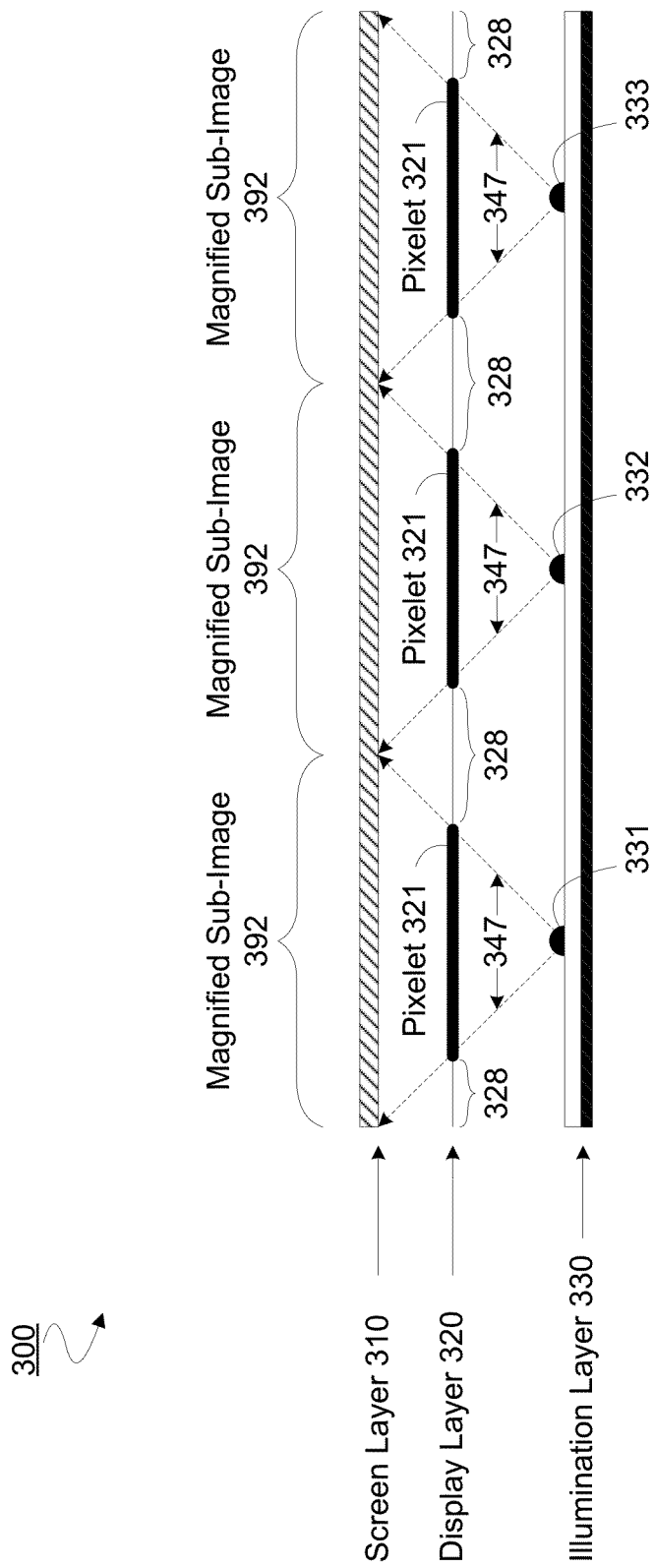
FIG. 3 is an illustration of a tileable display panel to display enhanced video data according to an embodiment.

FIG. 3 is an illustration of components of a tileable display panel for displaying image sub-portions according to an embodiment. In this embodiment, portions of the components of tileable display panel 300 are illustrated from a cross-sectional view as including an illumination layer 330 comprising light sources 331-333 to emit display light at a limited angular spread so the display light is directed toward pixelets 321 of a display layer 320—e.g. according to techniques described herein. When display light (including a corresponding image sub-portion) encounters screen layer 310, a magnified version of the image sub-portion is projected onto a backside of the screen layer so that it is viewable to the user, shown as magnified sub-images 392 from FIG. 3.

Each light source 331-336 is configured to emit a divergent projection beam 347 having a limited angular spread that is directed toward a specific corresponding one of multiple pixelets 321 in display layer 320, as illustrated in FIG. 3. In an embodiment, a distance between two of the pixelets 122 which are closest to one another is greater than a distance between adjacent pixels in either one of those two pixelets. For example, a distance between adjacent pixelets may be in a range of 7-20 times the size of a single pixel and/or in a range of 40-100 times the distance between pixels of a single pixelet.

In one embodiment, divergent projection beam 347 may be substantially shaped as a cone (circular aperture) or an inverted pyramid (rectangle/square aperture). Additional optics may be disposed over each light source in the array of light sources to define the limited angular spread (e.g. 20-70 degrees) and/or cross-sectional shape of divergent projection beam 347 emitted from the light sources. The additional optics (including refractive and/or diffractive optics) may also increase brightness uniformity of the display light so that the intensity of divergent projection beam 347 incident upon each pixel in a given pixelet is substantially similar.

In some embodiments (not illustrated in FIG. 3), divergent projection beams 347 from different light sources may overlap upon the spacing region 328 on the backside of display layer 320. In some embodiments, each pixelet is directly illuminated solely by one divergent projection beam from its corresponding light source, which may approximate a point source. In certain embodiments, a very small percentage of light from non-corresponding light sources may become indirectly incident upon a pixelet due to unabsorbed reflections of divergent projection beams 347 from non-corresponding light sources. Spacing regions 328 and illumination layer 330 may be coated with light absorption coatings (known in the art) to decrease reflections from non-corresponding light sources from eventually becoming incident upon a pixelet that does not correspond with the light source. The limited angular spread of the light sources may be designed to ensure that divergent projection beams 347 only directly illuminates the pixelet that corresponds to a particular light source. In contrast, conventional LCD technology utilizes light sources (e.g. LEDs or cold-cathode-fluorescents) with a generally Lambertian light distribution and diffusive filters in an attempt to generate uniform and diffuse light for backlighting the LCD panel. By implementing each light source (e.g., light sources 331-333) as a near point source, each pixel within a given pixelet exclusively projects onto a corresponding region on the backside of screen layer 310 on a one-to-one basis.

Figure 4:
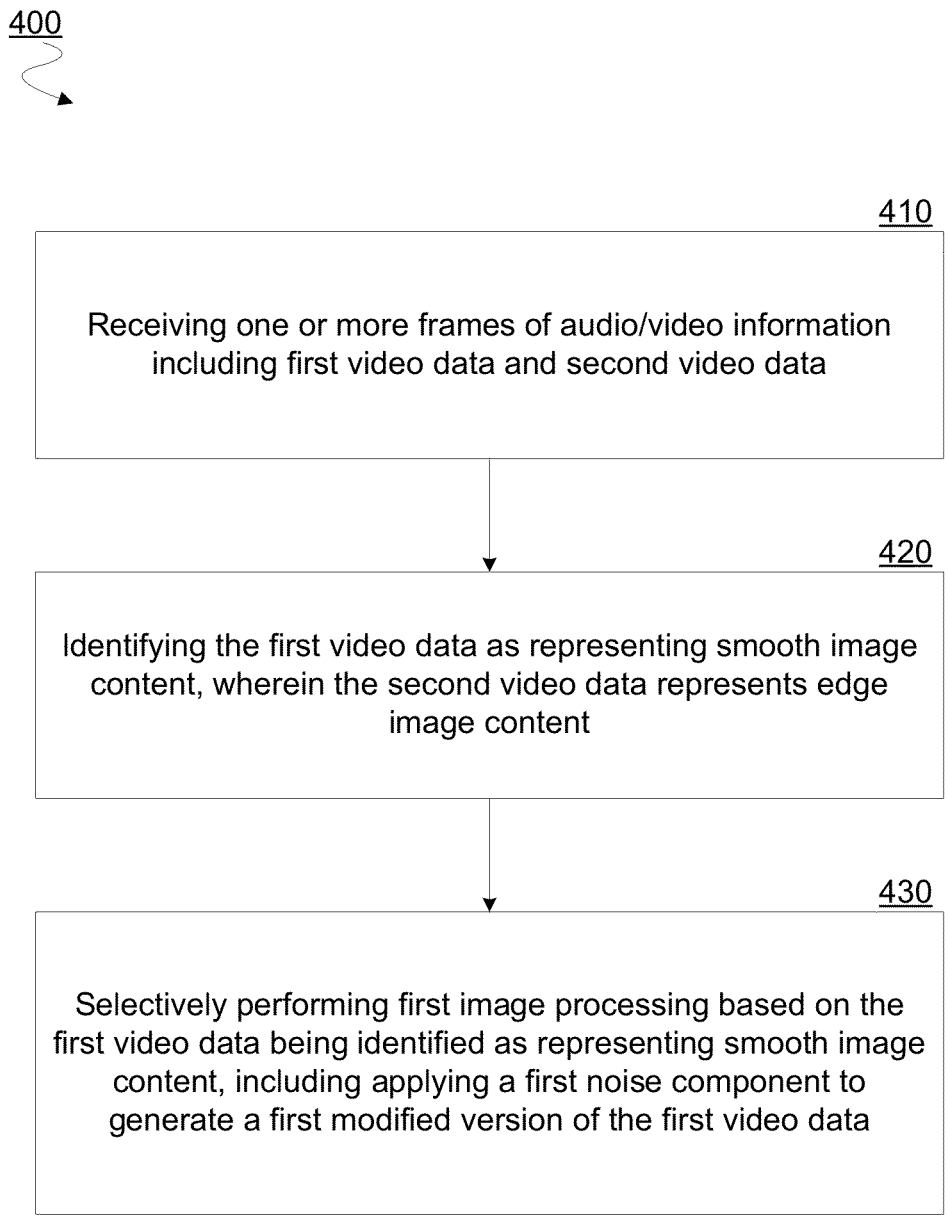
FIG. 4 is a flow diagram illustrating elements of a method for processing video data for display according to an embodiment.

FIG. 4 illustrates elements of a method 400 for processing video data according to an embodiment. Method 400 may process video data in preparation for a displaying of magnified sub-image portions by a display which, for example, has some or all of the features of tileable display panel 100. In an embodiment, method 400 is performed by any of a variety of hardware logic and/or executing software logic which, for example, is included in (or operates with) controller logic for an illumination layer and/or a display layer.

Method 400 may include, at 410, receiving one or more frames of audio/video information including first video data and second video data. The one or more frames may be received at 410 via any of a variety of video sources including, but not limited to, a cable or satellite television provider, a DVD player, gaming console, personal computer, handheld device, wired and/or wireless network and the like. The one or more frames may include a frame format according to any of a variety of audio-video specifications including, but not limited to, HDMI, MHL or the like. For example, such a frame format may include a video data region and one or more other regions for audio data and/or control information associated with the video data region. In an embodiment, the one or more frames include a first frame comprising the first video data and the second video data. Alternatively, the first video data and the second video data may span multiple frames of AV information. For example, the first video data and the second video data may each include respective video data portions of multiple frames of AV information.

Method 400 may further comprise, at 420, identifying the first video data as representing smooth image content. As used herein, the terms "smooth image content" and "edge image content" are to be distinguished from one another as different types of content as represented in respective displayed image sub-portions. Smooth image content may include that content of an image sub-portion which satisfies some test criterion for self-consistency with respect to one or more image characteristics. Content of a displayed image sub-portion may be considered smooth where, for example, a total range in a color space for all color values of the image sub-portion is at or below some a priori maximum threshold color range. Alternatively or in addition, such content may be considered smooth where a gradient of color transition of the image sub-portion—e.g. any such gradient color transition—is at or below some a priori maximum threshold color gradient. Alternatively or in addition, such content may be considered smooth where the image sub-portion can be identified—e.g. by feature recognition analysis of the corresponding video data—as having failed one or more edge detection evaluations and/or as being at least some minimum threshold distance away from a closest instance of edge content in the same image.

By contrast, content represented in a displayed sub-image may be considered edge image content where the image sub-portion can be identified—e.g. by feature recognition analysis of the corresponding video data such as Canny edge detection, Marr-Hildreth edge detection and/or the like—as including one or more edges. Identification of edge image content may include operations adapted from conventional edge detection techniques, the particulars of which are not limiting on certain embodiments and are not detailed herein.

Method 400 may further comprise, at 430, selectively performing first image processing based on the first video data being identified as representing smooth image content. In an embodiment, the selective image processing performed at 430 includes applying a first noise component to generate a first modified version of the first video data, wherein, of the first video data and the second video data, the first image processing modifies only the first video data. Certain embodiments result in a viewer unconsciously perceiving such a noise component as being comparatively high resolution image content.

By way of illustration and not limitation, the first video data may include a plurality of pixel color values—e.g. where each pixel color value is represented in terms of a RGB color space, a $YC_BC_R$ color space or the like. Some or all such pixel color values may be modified by the first image processing at 430—e.g. including variously adding to and/or subtracting from such pixel color values respective random or pseudo random noise values. In one embodiment, pixel values of the first video data are modified by the first image processing at 430 only with respect to one dimension of a color space—e.g. the blue dimension of the RGB color space.

Application of a noise component may result in an image dithering effect which is applied only to selective portions of a final displayed image—e.g. to provide for an improvement in perceived resolution of smooth image content. Such image noise/dithering may vary spatially in the final resulting image display. For example, method 400 may result in a first magnified image sub-portion based on the first video data being displayed at a first location of a display layer concurrent with a second magnified image sub-portion (e.g. based on the second video data) being displayed at a second location of a display layer. A level and/or type of dithering of the first magnified image sub-portion may be different than a corresponding level and/or type of any dithering of the second magnified image sub-portion. For example, any noise/dithering effect added by method 400 may be only to video data other than that corresponding to the second magnified image (e.g. only to video data other than the second video data).

In an embodiment, dithering resulting from the first image processing at 430 may vary over time. For example, method 400 may result in a first version of a magnified image sub-portion being displayed at a first location of a display layer, and a subsequent second version of that same magnified image sub-portion being displayed at the same first location of the display layer. The different versions may vary, for example, only (or at least) in terms of the different respective noise/dithering values which have been applied thereto.

Alternatively or in addition, the applying of the first noise component by the selective image processing at 430 may include providing random or pseudo-random variation in a position of a sub-image portion. By way of illustration and not limitation, a sub-image portion may be repeatedly projected in sequence onto a screen layer, where the location of the sub-image portion in the corresponding display layer (e.g. by a difference of a single pixel row and/or a single pixel column) is varied slightly between consecutive projections of the sequence. Such variation may be achieved, for example, by applying a noise component to a timing for providing video data to the display layer.

Figure 5:
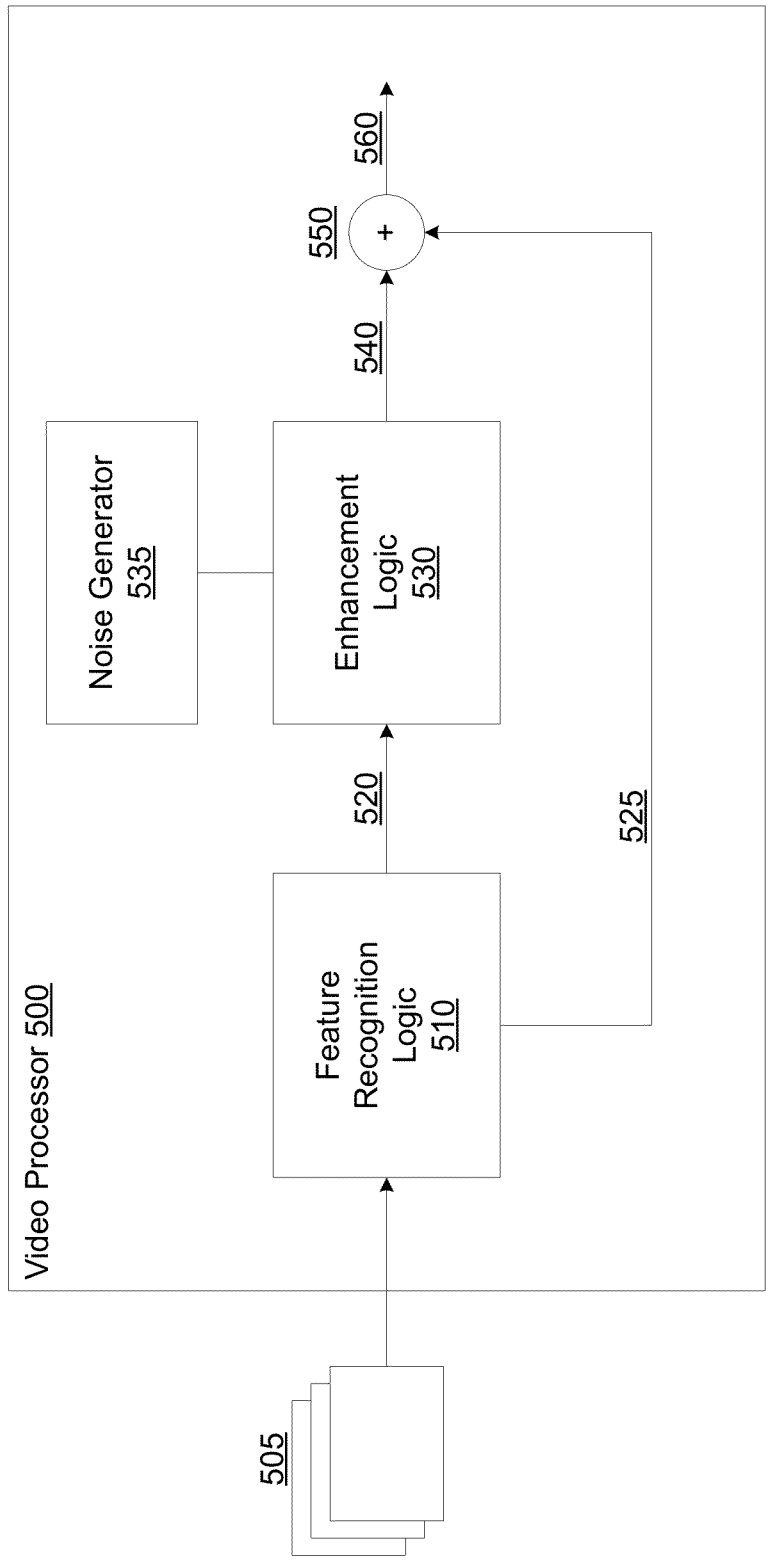
FIG. 5 is a block diagram illustrating elements of video a processor to enhance video data according to an embodiment.

FIG. 5 illustrates elements of a video processor 500 for enhancing video data according to an embodiment. Video processor 500 may process audio-video information in preparation for image sub-portions to be displayed—e.g. by display 100. For example, such processing may include video processor 500 performing method 400.

In an embodiment, video processor 500 includes feature recognition logic 510 to receive one or more frames of audio/video information—as represented by the illustrative frames 505. Feature recognition logic 510 may identify first video data 520 of frames 505 as representing smooth image content. Alternatively or in addition, feature recognition logic 510 may identify second video data 525 of frames 505 as representing edge image content.

In response to such identifying, feature recognition logic 510 may variously direct first video data 520 and second video data 525 for different respective video processing. By way of illustration and not limitation, feature recognition logic 510 may provide first video data 520 for processing by enhancement logic 530 of video processor 500, where any processing of second video data 525 based on the identifying of smooth image content (and/or identifying of edge image content) is to exclude processing by enhancement logic 530. For example, second video data 525 may bypass processing by enhancement logic 530 or be provided for other enhancement processing (not shown) which is different than that provided by enhancement logic 530. Accordingly, video processing by enhancement logic 530 may be selective—e.g. at least insofar as, of first video data 520 and second video data 525, such processing is to only modify first video data 520.

In an embodiment, enhancement logic 530 is coupled to or includes a noise generator 535 to provide a noise component to be applied to some or all of first video data 520 to generate at least one modified version of first video data 520. Such a modified version of first video data 520 is represented in FIG. 5 by the illustrative enhanced video data 540.

Video processor 500 provide second video data 525 and enhanced video data 540 for various subsequent processing by logic included in or coupled to video processor 500. By way of illustration and not limitation, combination logic 550 of video processor 500—e.g. including one more multiplexers—may interleave or otherwise combine second video data 525 and enhanced video data 540 with one another to generate an output 560 for additional processing by other video processing logic (not shown). Alternatively, second video data 525 and enhanced video data 540 may be provided as distinct parallel outputs for additional processing by such other video processing logic. Such additional processing may include, for example, one or more operations adapted from any of a variety of conventional video data processing techniques for generating signaling to control the displaying of image sub-portions by display hardware (not shown).

Figure 6:
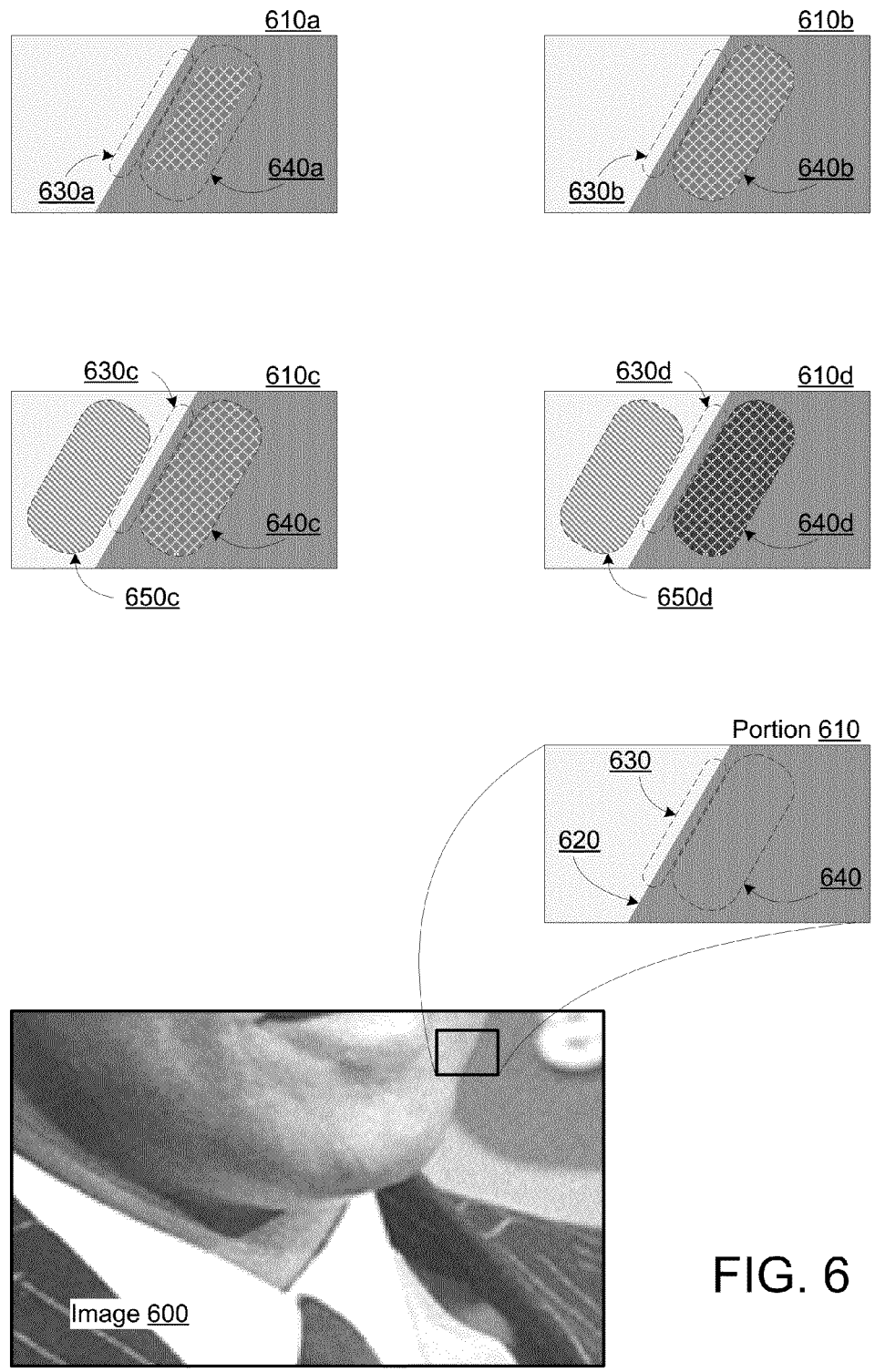
FIG. 6 is a representation of an image displayed according to an embodiment.

FIG. 6 illustrates elements of an image 600 to be displayed based on video data which is enhanced according to an embodiment. Image 600 may be displayed based on enhanced video data such as that which is generated by video processor 500—e.g. according to method 400. Alternatively or in addition, image 600 may be displayed with one or more display devices which, for example, include some or all of the features of tileable display panel 100.

Image 600 may be a single video frame or other digital image which, for example, may be variously projected repeatedly over time onto a display layer of a display device. Alternatively or in addition, image 600 may be one of a plurality of different video images which are displayed in sequence with one another—e.g. where each image is projected at least once on such a display layer.

In an embodiment, different portions (and/or sub-portions) of image 600 may be variously projected onto such a display layer. For example, one portion/sub-portion of image 600 may be repeatedly projected with an illumination element which illuminates repeatedly at a refresh rate different than a refresh rate at which another portion/sub-portion of image 600 is concurrently—and in an embodiment, repeatedly—projected. Alternatively or in addition, a total number of times that one portion/sub-portion of image 600 is projected on the display layer may differ from a total number of times that another portion/sub-portion of image 600 is concurrently projected on the display layer.

The difference between the number of projections and/or refresh rates for various portions/sub-portions of image 600 may be based, for example, on the respective content represented in such portions/sub-portions of image 600. For example, a portion/sub-portion of image 600 which represents smooth image content may be refreshed at a higher rate than another portion/sub-portion of image 600 which represents edge image content.

In an illustrative scenario according to one embodiment, image 600 may include a portion 610 comprising a representation of an edge 620 which, for example, is located at an interface of two regions of different respective colors (and/or ranges of colors). Portion 610 may be displayed based on video data which, for example, includes first video data corresponding to a first sub-portion 640 of portion 610 and second video data corresponding to a second sub-portion 630 of portion 610.

FIG. 6 shows a detail view of portion 610 as it would be displayed if the image processing of the first video data were not enhanced according to techniques of certain embodiments. FIG. 6 also shows detail views of alternative versions 610*a*, 610*b*, 610*c*, 610*d* of portion 610, where each of the alternative sub-portions 610*a*, 610*b*, 610*c*, 610*d* illustrates a result of video data enhancement according to a respective embodiment. More particularly, various patterns are shown in sub-portions 610*a*, 610*b*, 610*c*, 610*d* to represent areas where video noise artefacts (e.g. dithering and/or location variation) are applied. Such dithering/noise may provide for an improvement in perceived resolution of sub-portions 610*a*, 610*b*, 610*c*, 610*d*.

In portion 610*a*, a sub-portion 640*a* includes a relatively simple dithering artefact which is added along rows of sub-portion 610*a*—e.g. wherein noise is added to pixels within a range of pixel rows, and where each such pixel is within a threshold distance of a respective pixel in the same row which represents part of edge 620. In an embodiment, a sub-portion 630*a* of portion 610*a* which represents edge image content has no dithering added (or alternatively, a different type or level of dithering added).

In portion 610*b*, a sub-portion 640*b* includes a dithering noise pattern which has been added by relatively more complex processing—e.g. as compared to that for providing dithering in sub-portion 640*a*. Such processing may provide for dithering in sub-portion 640*b* to better conform to all of that area which has been identified as representing smooth video content. As with sub-portion 630*a*, a sub-portion 630*b* of portion 610*b* may represent edge image content which has different, or no, dithering added.

In portion 610*c*, a sub-portion 640*c* and another sub-portion 650*c* may each represent respective smooth video content, where sub-portions 640*c*, 650*c* are on opposite sides of a sub-portion 630*d* representing edge video content. Video data processing according to an embodiment may provide for respective dithering artefacts in each of sub-portions 640*c*, 650*c*—e.g. where sub-portion 630*d* has different dithering, or no dithering, added.

Portion 610*d* may include one or more of sub-portions 630*d*, 640*d*, 650*d* which, respectively, include some or all of the features of sub-portions 630*c*, 640*c*, 650*c*. Certain embodiments provide for selectively varying projection refresh rates—e.g. in addition to selectively adding dithering artefacts as discussed herein. For example, a sub-portion representing smooth video content, such as sub-portion 640*d* may be projected on the display screen at a higher refresh rate than that for projecting the sub-portion 630 representing edge video content. Such a higher refresh rate is represented in portion 610*d* by the relatively high contrast pattern in sub-portion 640*d*.

Figure 7:
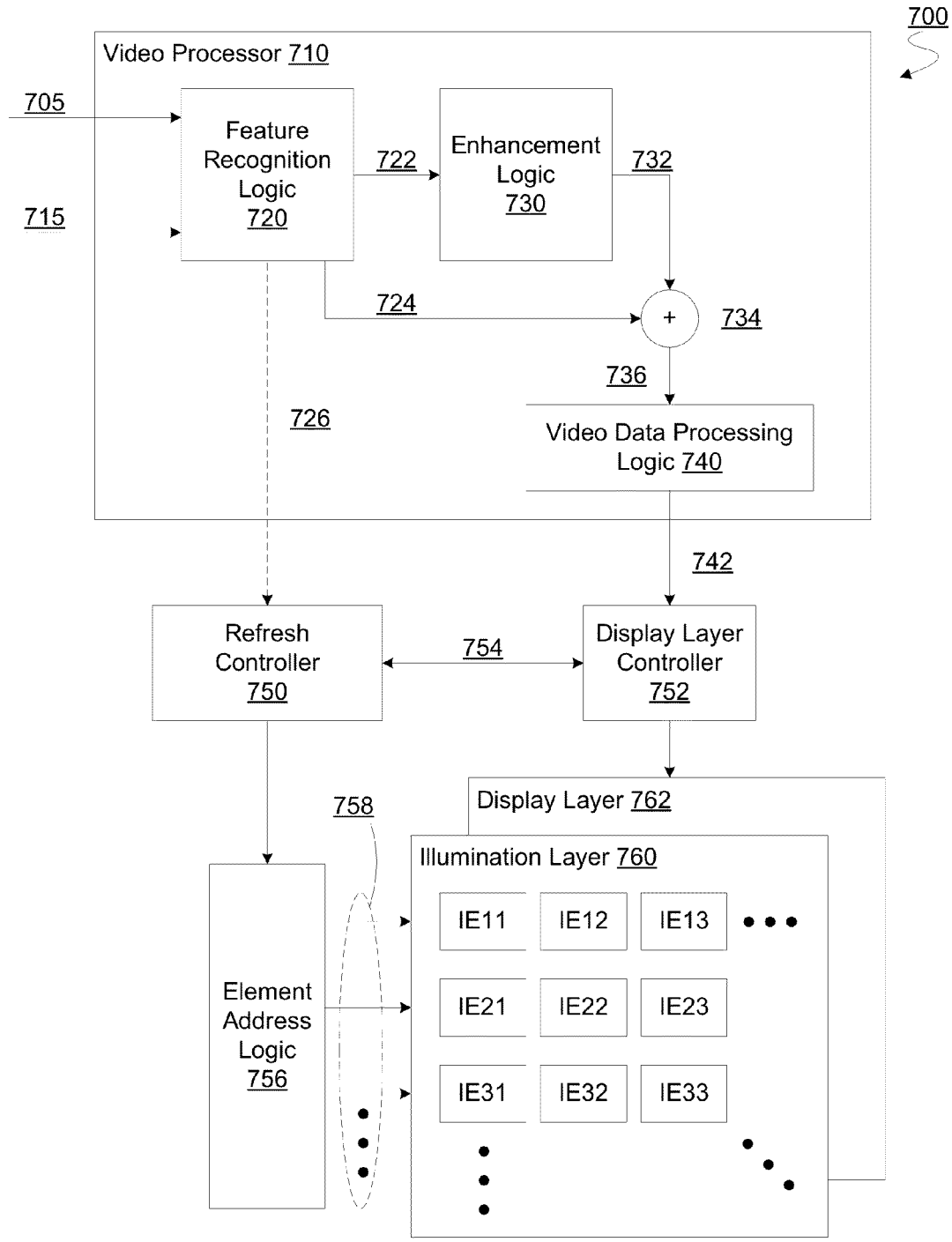
FIG. 7 is a block diagram illustrating elements of a display device to process and display video data according to an embodiment.

FIG. 7 illustrates elements of a system 700 for displaying video images according to an embodiment. System 700 includes a video processor 710 to process audio-video information in preparation for image sub-portions to be displayed—e.g. by display hardware of system 700 such as that of display 100, display 300 or the like. For example, video processor 710 may include some or all of the features of video processor 500.

In an embodiment, video processor 710 includes feature recognition logic 720 to receive one or more frames of audio/video information—as represented by the illustrative frames 705. Feature recognition logic 720 may identify first video data 722 of frames 705 as representing smooth image content. Alternatively or in addition, feature recognition logic 720 may identify second video data 724 of frames 705 as representing edge image content, as discussed herein. In response to such identifying, feature recognition logic 720 may variously direct first video data 722 and second video data 724 for different respective video processing—e.g. where, of first video data 722 and second video data 724, only first video data 722 is processed by enhancement logic 730 of video processor 710.

In an embodiment, identification of first video data 722 and second video data 724 may additionally or alternatively be based on information 715 received from or otherwise describing another system (e.g. another display device, not shown) which operates with system 700. For example, information 715 may include video data which the other system is to display. Alternatively or in addition, information 715 may indicate a position or other configuration of the other system relative to system 700. Based on information 715, feature recognition logic 720 may, in certain embodiments, identify a video data portion of frames 705 as corresponding to a video data portion of information 715—e.g. where such video data portions are to represent respective image content which are to adjoin one another. In response to such identification, feature recognition logic 720 may use such video data portion of information 715 for improved edge detection and/or related operations as discussed herein. In some embodiments, feature recognition logic 720 may provide a result of such operations to the other system or, alternatively, to some other device for controlling image display operations of the other system.

Enhancement logic 730 may add a noise component to some or all of first video data 722 to generate a modified version of first video data 722, as represented by enhanced video data 732. Combination logic 734 of video processor 710 may combine second video data 724 and enhanced video data 740 with one another to generate output 736 for additional processing—e.g. by video data processing logic 740 which, for example, provides functionality adapted from conventional video data encoding techniques.

In an embodiment, operation of video processor 700 controls other display hardware of system 700. For example, display hardware of system 700 may include an illumination layer 760 and a display layer 762. Operation of illumination layer 760 and display layer 762 may correspond to operation of illumination layer 130 and display layer 120, respectively.

For example, illumination layer 760 may include a respective illumination elements (IE) for each of a plurality of regions of display layer 762. By way of illustration and not limitation, illumination layer 760 may include multiple rows of IEs comprising, for example, a first row including illumination elements IE11, IE12, IE13, a second row including illumination elements IE21, IE22, IE23, a third row including illumination elements IE31, IE32, IE33 and/or the like. Over time, individual IEs of illumination layer 760 may each be activated repeatedly, where each such activation is for that IE to emit light to illuminate a corresponding region—e.g. a corresponding pixelet (not shown)—of display layer 762. Such light illuminates through an image sub-portion which is concurrently displayed on that region of the display layer, resulting in a magnified image sub-portion being projected onto a screen layer (not shown) of system 700

In an embodiment, some or all of IEs of illumination layer 762 may be variously operated—e.g. independent of one another—to provide for different refresh rates for the illumination of different respective regions of display layer 762. For example, system 700 may include a display layer controller 752 which controls how image sub-portions are to be variously displayed at different regions of display layer 762. Such control may be based, for example, on display layer controller 752 receiving decoded video data information from video data processing logic 740 or other hardware of video processor 710. Alternatively or in addition, system 700 may include a refresh controller 750 which controls how IEs of illumination layer 760 are to variously illuminate such image sub-portions displayed on display layer 762.

For example, operation of refresh controller 750 and display layer controller 752 may be coordinated based on signals 754 exchanged between, or otherwise shared by, refresh controller 750 and display layer controller 752. Refresh controller 750 may further operate based on other signals 726 specifying or otherwise indicating portions of video data which represent edge image content and/or portions of video data which represent smooth image content. Based on signals 754, 726, refresh controller 750 may detect, for each of various regions of display layer 762, when that region is displaying (or is to display) smooth video content and/or when that region is displaying (or is to display) edge video content. In response, refresh controller 750 may selectively signal different refresh rates for IEs of illumination layer 760 to variously illuminate different respective regions of display layer 762. By way of illustration and not limitation, refresh controller 750 may signal element address logic 756 of system 700 to provide signaling 758 for variously addressing respective IEs of illumination layer 760. The signaling 758 may specify or otherwise indicate different refresh rates which, for example, determine illumination rates for different concurrent sub-portions of the same image displayed by system 700.

Figure 8A:
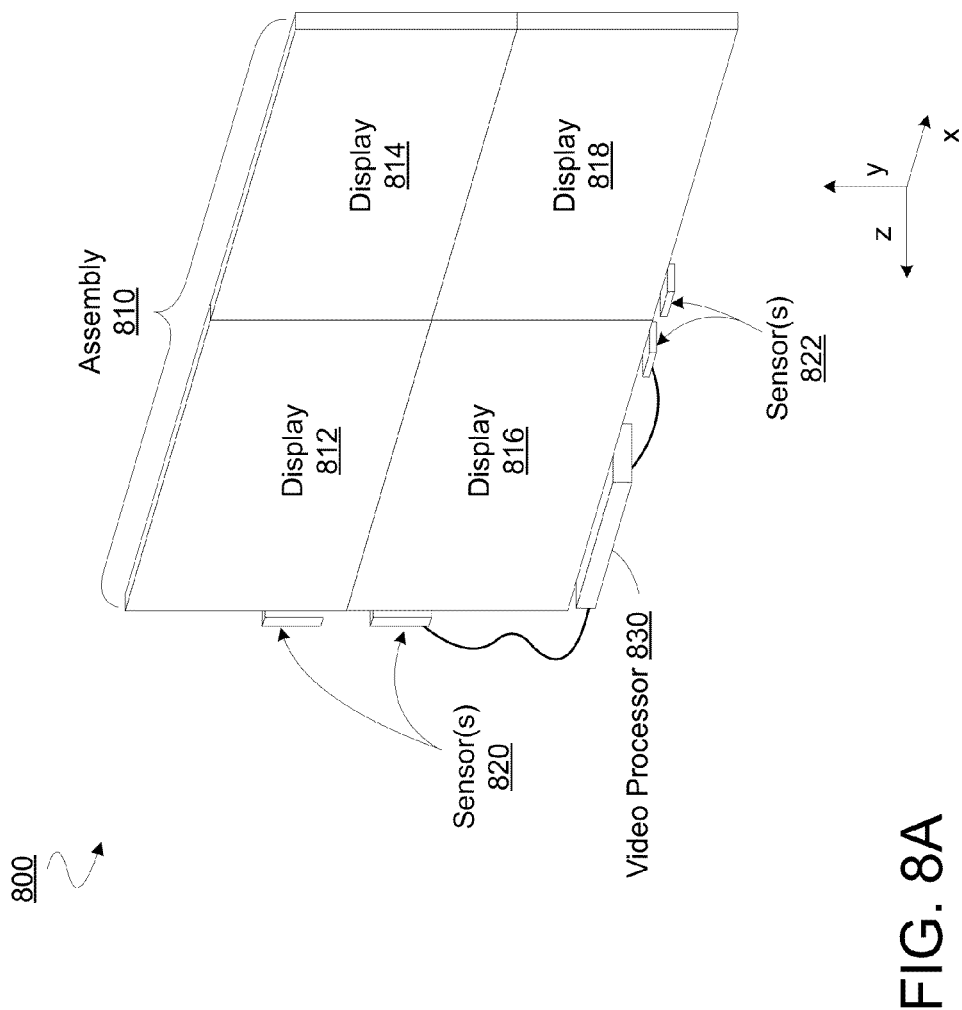
FIG. 8A is an illustration of an assembly of display devices to display video data according to an embodiment.

FIG. 8A illustrates elements of a system 800 for displaying images according to an embodiment. System 800 may include an assembly 810 of tileable display panels—e.g. including panels which each include some or all of the features of display panel 100, display panel 300 or the like. For example, assembly 810 is shown as including an illustrative two-by-two array of displays 812, 814, 816, 818, various pairs of which have respective sides adjoining one another along an x-dimension or along a y-dimension. However, assembly 810 may include any of a variety of additional or alternative configurations of displays, according to different embodiments.

Certain features of various embodiments are discussed herein with respect to image sub-portions which are displayed at least in part by display 816 at or near a side of display 16 which adjoins a side of display 812 along the x-dimension. However, such discussion may be extended to additionally or alternatively apply to image sub-portions variously displayed at one or more other locations of assembly 810. Displays 812, 814, 816, 818 may be variously mounted into or on a wall, ceiling, floor or other fixed structure (not shown).

Assembly 800 may include or couple to mounting hardware and/or structures or mechanisms for connection to such mounting hardware. One or more mechanisms, represented by the illustrative sensors 820, 822, may detect presence—e.g. including detecting proximity and/or position—of one display in relation to another display. By way of illustration and not limitation, sensors 820 may provide laser, magnetic and/or other sensor mechanisms to detect adjacency of displays 812, 816 to one another and/or to detect configuration of displays 812, 816 with respect to one another. Alternatively or in addition, sensors 822 may similarly detect proximity and/or configuration of displays 816, 818 with respect to one another.

System 830 may include a video processor 830 which, for example, is included in or coupled to display 816. Video processor 830 may process frames of AV information to enhance video data for display 816—e.g. according to the techniques of method 400. In an embodiment, video processor 830 receives information—e.g. from some or all of sensors 820, 822—which specifies or otherwise indicates a configuration of devices in assembly 810 with respect to one another. Additionally or alternatively, such information may include a version of video data which is to be displayed by display 812 (or another display of assembly 810). Based on such information, video processor 830 may identify video data for display 812 as corresponding to other video data for video data for display 816—e.g. where such video data portions are to represent respective adjoining image content. In response to such identification, video processor 830 may use both such video data portions—e.g. for improved edge detection.

Figure 8B:
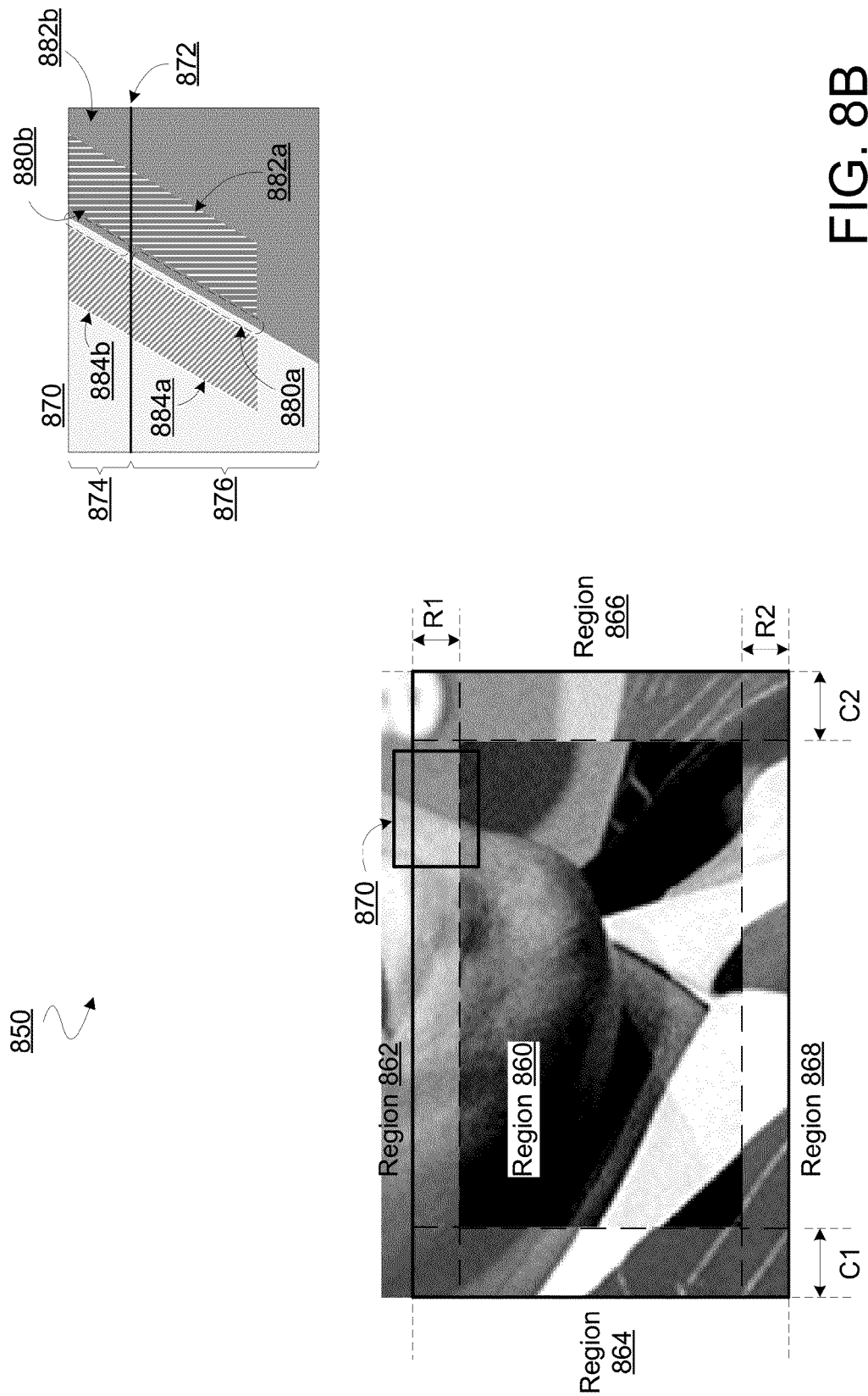
FIG. 8B illustrates features of an image displayed based on enhanced video data according to an embodiment.

FIG. 8B illustrates elements of an image 850 displayed by system 800 based on video data which is enhanced according to an embodiment. Image 850 may be displayed based on video data which is enhanced by video processor 830—e.g. according to method 400. The displayed image 850 includes a region 860 and regions 862, 864, 866, 868 which each adjoin a respective side of region 860. Some or all of regions 860, 862, 864, 866, 868 may be regions of the same display—e.g. regions of a screen layer of display 816. Alternatively, regions 860, 862, 864, 866, 868 may include regions of different displays—e.g. where region 860 is a region of a screen layer of display 816 and region 862 is a region of a screen layer of display 812. In an embodiment, regions 860, 862, 864, 866, 868 each correspond to a different respective pixelet which is illuminated for projection of a corresponding portion of the displayed image 850.

As shown in FIG. 8B, region 860 may include sub-regions R1, R2 which are closest to regions 862, 868, respectively, and sub-regions C1, C2 which are closest to regions 864, 866, respectively. In an embodiment, the video processor 830 may selectively add video data dithering and/or selectively set a refresh rate based on whether (or not) video data corresponds to image content in one of R1, R2, C1, C2. Such selective dithering and/or refreshing may be variously performed concurrently for multiple regions. By way of illustration and not limitation, a portion 870 of displayed image 850 includes respective sub-portions 874, 876 of regions 860, 862. Sub-portions 874, 876 may adjoin one another along an interface 872, which may be an interface between adjacent displays (although certain embodiments are not limited in this regard).

In an illustrative scenario according to one embodiment, an image sub-region 880a in sub-portion 876 may represent edge image content and an image sub-region 880b in sub-portion 874 may represent edge image content. Identification of either or each of sub-regions 880a, 880b as representing edge image content may be based on features recognition of respective video data for both of sub-regions 880a, 880b. Certain embodiments variously perform video data enhancement to improve perceived resolution of smooth image content adjoining at least one of sub-regions 880a, 880b. For example, one or both of a sub-region 882a and/or a sub-region 884a of region 860 may be identified as representing smooth video content. In response to such identification, video data enhancement may provide for dithering in one or both of sub-regions 882a, 884a—e.g. where sub-region 880a is selectively excluded from the providing of such dithering. Alternatively or in addition, one or both of a sub-region 882b and/or a sub-region 884b of region 862 may be identified as representing smooth video content. In response to such identification, video data enhancement may provide for dithering in one or both of sub-regions 882b, 884b—e.g. where sub-region 880b is selectively excluded from the providing of such dithering. The combination of selective dithering for each of sub-regions 874, 876—e.g. in addition to selectively determining different refresh rates for respective portions of image 850—may improve the perceived resolution of image content along interface 872.

Figure 9:
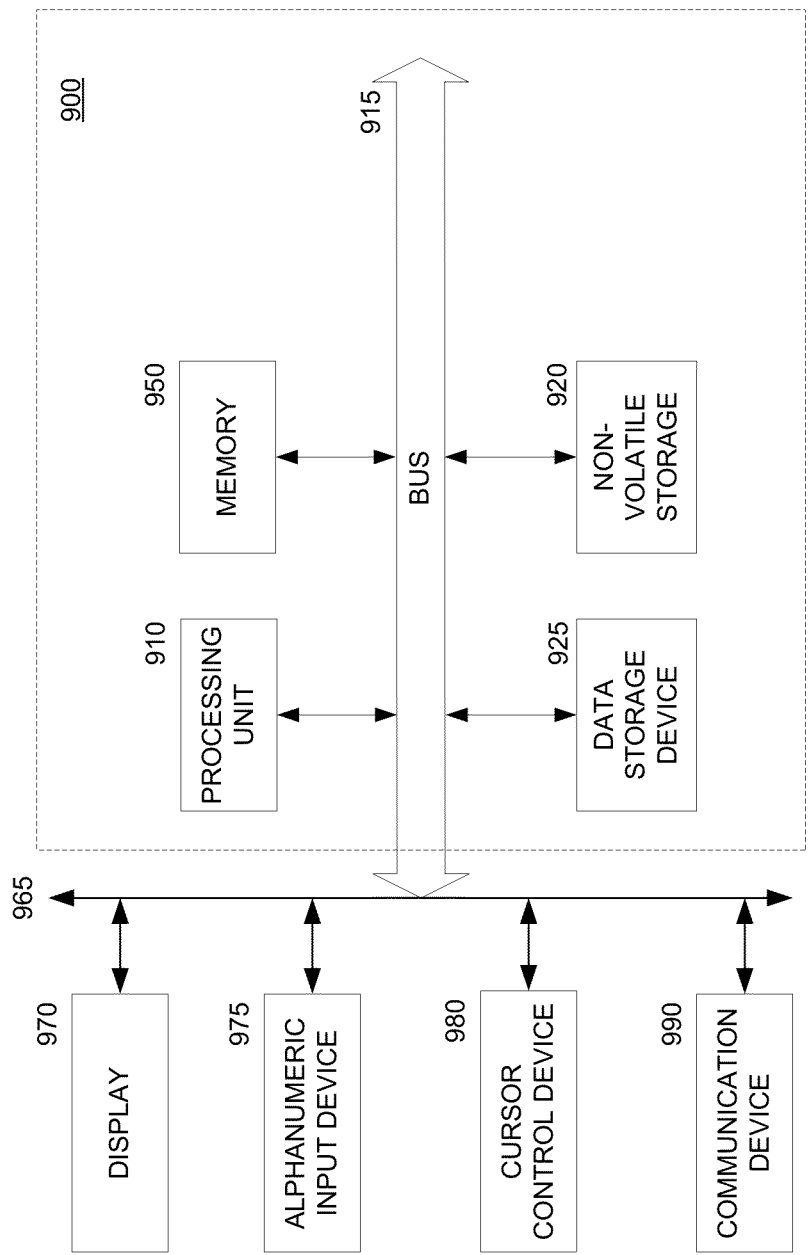
FIG. 9 is an illustration of components of a hardware platform according to an embodiment.

FIG. 9 is an illustration of components of a device to utilize an embodiment of the disclosure. Platform 900 may be used for one of the tileable display panels described above. Platform 900 may also be used to provide video processing, power, display control computing ability (e.g., decoding and converting content) and/or connectivity (e.g., network connectivity) to a device including a tileable display panel. For example, platform 900 may comprise display driver components communicatively coupled to the above described tileable display panel. Platform 900 may be used to decode/ convert content into video signal formats such as high definition multimedia interface (HDMI), component, composite digital visual interface (DVI), video graphics adapter (VGA), Syndicat des Constructeurs d'Appareils Radiorecepteurs et Televiseursor (SCART), or other video signal formats.

Platform 900 as illustrated includes bus or other internal communication means 915 for communicating information, and processor 910 coupled to bus 915 for processing information. The platform further comprises random access memory (RAM) or other volatile storage device 950 (alternatively referred to herein as main memory), coupled to bus 915 for storing information and instructions to be executed by processor 910. Main memory 950 also may be used for storing temporary variables or other intermediate information during execution of instructions by processor 910. Platform 900 also comprises read only memory (ROM) and/or static storage device 920 coupled to bus 915 for storing static information and instructions for processor 910, and data storage device 925 such as a magnetic disk, optical disk and its corresponding disk drive, or a portable storage device (e.g., a universal serial bus (USB) flash drive, a Secure Digital (SD) card). Data storage device 925 is coupled to bus 915 for storing information and instructions.

Platform 900 may further be coupled to display device 970, such as a cathode ray tube (CRT) or an LCD coupled to bus 915 through bus 965 for displaying information to a computer user. In embodiments where platform 900 provides computing ability and connectivity to a created and installed display device, display device 970 may comprise any of the tileable display panels described above. Alphanumeric input device 975, including alphanumeric and other keys, may also be coupled to bus 915 through bus 965 (e.g., via infrared (IR) or radio frequency (RF) signals) for communicating information and command selections to processor 910. An additional user input device is cursor control device 980, such as a mouse, a trackball, stylus, or cursor direction keys coupled to bus 915 through bus 965 for communicating direction information and command selections to processor 910, and for controlling cursor movement on display device 970. In embodiments utilizing a touch-screen interface, it is understood that display 970, input device 975 and cursor control device 980 may all be integrated into a touch-screen unit.

Another device, which may optionally be coupled to platform 900, is a communication device 990 for accessing other nodes of a distributed system via a network. Communication device 990 may include any of a number of commercially available networking peripheral devices such as those used for coupling to an Ethernet, token ring, Internet, or wide area network. Communication device 990 may further be a null-modem connection, or any other mechanism that provides connectivity between computer system 900 and the outside world. Note that any or all of the components of this system illustrated in FIG. 9 and associated hardware may be used in various embodiments of the disclosure.

It will be appreciated by those of ordinary skill in the art that any configuration of the system illustrated in FIG. 9 may be used for various purposes according to the particular implementation. The control logic or software implementing embodiments of the disclosure can be stored in main memory 950, mass storage device 925, or other storage medium locally or remotely accessible to processor 910.

It will be apparent to those of ordinary skill in the art that any system, method, and process to capture media data as described herein can be implemented as software stored in main memory 950 or read only memory 920 and executed by processor 910. This control logic or software may also be resident on an article of manufacture comprising a computer readable medium having computer readable program code embodied therein and being readable the mass storage device 925 and for causing processor 910 to operate in accordance with the methods and teachings herein.

Embodiments of the disclosure may also be embodied in a handheld or portable device containing a subset of the computer hardware components described above. For example, the handheld device may be configured to contain only the bus 915, the processor 910, and memory 950 and/or 925. The handheld device may also be configured to include a set of buttons or input signaling components with which a user may select from a set of available options. The handheld device may also be configured to include an output apparatus such as a LCD or display element matrix for displaying information to a user of the handheld device. Conventional methods may be used to implement such a handheld device. The implementation of the disclosure for such a device would be apparent to one of ordinary skill in the art given the disclosure as provided herein.

Embodiments of the disclosure may also be embodied in a special purpose appliance including a subset of the computer hardware components described above. For example, the appliance may include processor 910, data storage device 925, bus 915, and memory 950, and only rudimentary communications mechanisms, such as a small touch-screen that permits the user to communicate in a basic manner with the device. In general, the more special-purpose the device is, the fewer of the elements need be present for the device to function.

Techniques and architectures for enhancing image displays are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a tangible or non-transitory machine (e.g., computer) readable storage medium, that when executed by a machine will cause the machine to perform the operations described. A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, such a storage medium may include, but is not limited to, any of various storage disks including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus. Additionally, the processes may be embodied within hardware, such as an application specific integrated circuit ("ASIC") or otherwise.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A non-transitory computer-readable storage medium having stored thereon instructions which, when executed by one or more processing units, cause the one or more processing units to perform a method comprising:
   receiving one or more frames of audio/video information including first video data and second video data;
   identifying the first video data as representing smooth image content, wherein the second video data represents edge image content;
   selectively performing first image processing based on the first video data being identified as representing smooth image content, including applying a first noise component to generate a first modified version of the first video data, wherein, of the first video data and the second video data, the first image processing modifies only the first video data, and wherein a first tileable display device generates a first image based on the first image processing;
   receiving other video data and a description of a configuration of a second tileable display device relative to the first tileable display device, wherein the second tileable display device generates a second image based on the other video data, and wherein the first video data is identified as representing smooth image content based on the other video data and further based on the description of the configuration of the second tileable display device relative to the first tileable display device.

2. The computer-readable storage medium of claim 1, wherein the first noise component provides a dithering effect for the smooth image content.

3. The computer-readable storage medium of claim 1, wherein selectively performing the first image processing further comprises applying a second noise component to generate a second modified version of the first video data, the method further comprising:
   outputting the first modified version of the first video data for a display of a first magnified image sub-portion at a first display location; and
   outputting the second modified version of the first video data for a display of a second magnified image sub-portion at the first display location.

4. The computer-readable storage medium of claim 1, further comprising selectively setting a refresh rate based on the first video data being identified as representing smooth image content.

5. The computer-readable storage medium of claim 4, wherein, of the first video data and the second video data, the refresh rate is set for only the first video data.

6. The computer-readable storage medium of claim 4, wherein the refresh rate is set for the first video data, and wherein the refresh rate is greater than another refresh rate for the second video data.

7. The computer-readable storage medium of claim 1, further comprising concurrently performing:
   first refreshes at a first rate for magnified image sub-portions at a first location of the first tileable display device; and
   second refreshes at a second rate for magnified image sub-portions at a second location of the first tileable display device.

8. A method implemented by a video processor, the method comprising:
   receiving one or more frames of audio/video information including first video data and second video data;
   identifying the first video data as representing smooth image content, wherein the second video data represents edge image content;
   selectively performing first image processing based on the first video data being identified as representing smooth image content, including applying a first noise component to generate a first modified version of the first video data, wherein, of the first video data and the second video data, the first image processing modifies only the first video data, and wherein a first tileable display device generates a first image based on the first image processing;
   receiving other video data and a description of a configuration of a second tileable display device relative to the first tileable display device, wherein the second tileable display device generates a second image based on the other video data, and wherein the first video data is identified as representing smooth image content based on the other video data and further based on the description of the configuration of the second tileable display device relative to the first tileable display device.

9. The method of claim 8, wherein the first noise component provides a dithering effect for the smooth image content.

10. The method of claim 8, wherein selectively performing the first image processing further comprises applying a second noise component to generate a second modified version of the first video data, the method further comprising:
   outputting the first modified version of the first video data for a display of a first magnified image sub-portion at a first display location; and
   outputting the second modified version of the first video data for a display of a second magnified image sub-portion at the first display location.

11. The method of claim 8, further comprising selectively setting a refresh rate based on the first video data being identified as representing smooth image content.

12. The method of claim 11, wherein, of the first video data and the second video data, the refresh rate is set for only the first video data.

13. A video processor device comprising:
   feature recognition logic configured to receive one or more frames of audio/video information including first video data and second video data, the feature recognition logic including circuitry configured to identify the first video data as representing smooth image content, wherein the second video data represents edge image content; and
   enhancement logic configured to selectively perform first image processing based on the first video data being identified as representing smooth image content, the first image processing to apply a first noise component to generate a first modified version of the first video data, wherein, of the first video data and the second video data, the first image processing modifies only the first video data, wherein a first tileable display device is to generate a first image based on the first image processing;
   wherein the feature recognition logic further to receive other video data and a description of a configuration of a second tileable display device relative to the first tileable display device, wherein the second tileable display device is to generate a second image based on the other video data, and wherein the feature recognition logic to identify the first video data as representing smooth image content based on the other video data and further based on the description of the configuration of the second tileable display device relative to the first tileable display device.

14. The video processor device of claim 13, wherein the first noise component provides a dithering effect for the smooth image content.

\* \* \* \* \*